T. A. B. PUTNAM.
ELECTROMAGNETIC RAILROAD SWITCH ALARM.
No 99,233. Patented Jan. 25, 1870.
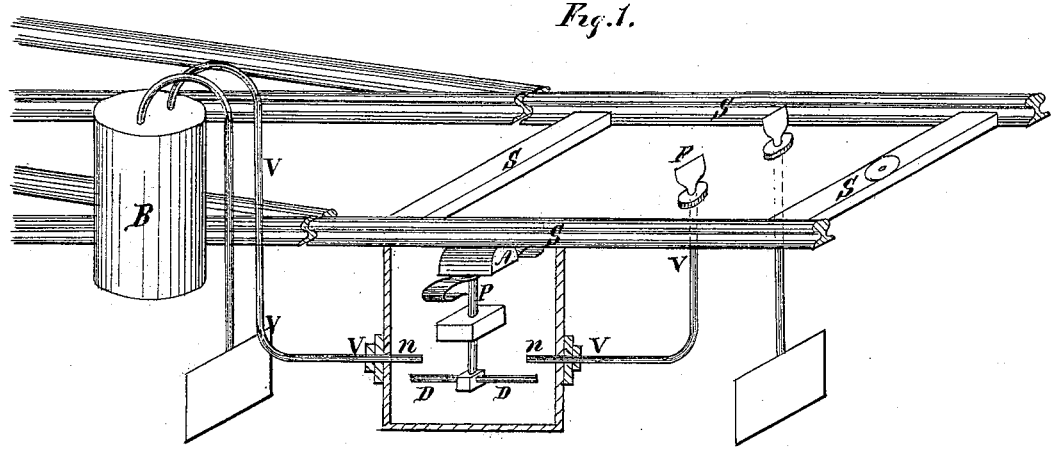
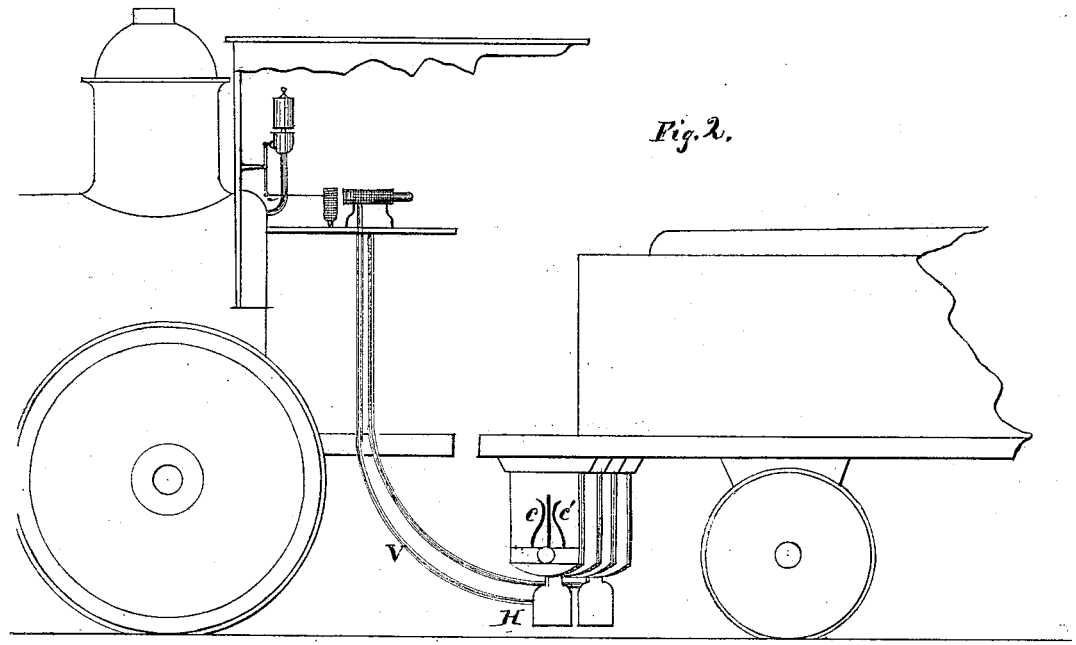
Witnesses:
A. B. Woodhead 156 West 48th St N.Y.
M. A. Putnam    "    "    "
Inventor:
Theodore A. B. Putnam

United States Patent Office.

THEODORE A. B. PUTNAM, OF NEW YORK, N. Y.

Letters Patent No. 99,233, dated January 25, 1870.

IMPROVEMENT IN ELECTRO-MAGNETIC RAILROAD-SWITCH ALARMS.

The Schedule referred to in these Letters Patent, and making part of the same.

Be it known that I, THEODORE A. B. PUTNAM, of the city, county, and State of New York, have invented a new and useful Mode of Connecting Misplaced Switches and Approaching Trains; and I do hereby declare that the following is a full description thereof, reference being had to the accompanying drawings, and to the letters of reference marked thereon.

The nature of my invention consists in the conduction of electricity, by a wire, from a voltaic battery at any given point, such wire passing underneath and connecting with any switch-rail, in such manner as shall be hereafter described, such wire of conduction to proceed to any given distance from such switch-rail, and to form a connection with a steam or bell-alarm on any approaching locomotive or moving power, for the purpose of giving notice of the movement or misplacing of such switch-rail, in such manner as shall be hereafter described.

My invention consists, first, of the spring A, so mounted upon a suitable platform or box, underneath the switch-rail S, as to have a free perpendicular or rising and descending movement, when relieved from or subjected to the pressure of the switch-rail S.

Attached to, and moving with the spring A, is the arm P, said arm P being attached to or terminated by the copper bar D.

The wire of conduction V, passing underneath the switch-rail S, is severed at that point, and to the two ends are attached two copper prolongations, $n\ n$, such prolongations not being in contact one with another, and so placed as to be above or in a higher plane than the bar D, during the period such bar D is forced down by the spring A; but when the spring A is relieved from pressure, it rises, and the attached bar D, rising with it, touches or comes in contact with the two prolongations $n\ n$, so forming a continuous conducting-wire for the electric current.

The conductive wire V being carried along the railway to any given distance from the switch-rail S, is terminated in the upward prolongation F.

Attached to any convenient part of the locomotive or moving body, is the movable copper conductor H, said conductor H being so hung as to come in contact with and press against the prolongation F, the lateral or yielding movement of the conductor H allowing it to pass over and beyond the prolongation F, and is kept in contact with such prolongation, while passing over, by the springs $c\ c'$, thus forming a continuous electric conductor to the locomotive or moving body, said springs $c\ c'$ restoring the conductor to its original position, after having passed, or been relieved from the resistance of the prolongation F.

The electricity so conducted to the locomotive or moving body, acts upon an electro-magnet and suitable armature, operating a steam or bell-alarm, as may be most desirable, the electric circuit being completed by the return-wire from the magnet connecting with a movable conductor, similar to H, such conductor connecting with a prolongation similar to F, attached to an earth-plate, such return-conductors acting at the same time, or simultaneously with H and F, to perfect the circuit.

I wish to be understood as not confining myself to the shape or form of the conductors F and H, as shown in the drawings, but reserve to myself the privilege to change and conform such conductors as may be most desirable to the end to be attained, reserving the privilege to dispense completely with the return-conductors similar to F and H, if it is found that any part of the locomotive or moving body will act as such conductor to the earth.

I also desire to have it understood that I have the privilege to insulate the wire V, and to bed or dispose of such wire as may be most desirable, and further, to insulate every and all conductors and parts that may need such insulation.

Having described the mechanical device and application,

What I desire to secure by Letters Patent, and claim as my invention, is—

The spring A, bar and arm D P, and conductor H, in combination with the battery B, wire V, electro-magnet, armature, and alarm, for the purposes as herein described and set forth.

THEODORE A. B. PUTNAM.

Witnesses:
A. B. WOODHEAD.
M. A. PUTNAM.